(12) United States Patent
Hoare et al.

(10) Patent No.: US 10,059,343 B2
(45) Date of Patent: Aug. 28, 2018

(54) APPARATUS AND METHOD FOR USE IN A VEHICLE

(71) Applicant: Jaguar Land Rover Limited, Coventry, Warwickshire (GB)

(72) Inventors: Edward Hoare, Malvern (GB); Thuy-Yung Tran, Rugby (GB); Liam Daniel, Birmingham (GB); Mikhail Cherniakov, Birmingham (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 0 days.

(21) Appl. No.: 15/118,353

(22) PCT Filed: Feb. 3, 2015

(86) PCT No.: PCT/EP2015/052154
§ 371 (c)(1),
(2) Date: Aug. 11, 2016

(87) PCT Pub. No.: WO2015/121110
PCT Pub. Date: Aug. 20, 2015

(65) Prior Publication Data
US 2017/0166218 A1 Jun. 15, 2017

(30) Foreign Application Priority Data
Feb. 12, 2014 (GB) .................................. 1402395.6

(51) Int. Cl.
*B60T 8/32* (2006.01)
*G05D 1/00* (2006.01)
(Continued)

(52) U.S. Cl.
CPC .......... *B60W 40/105* (2013.01); *B60W 30/06* (2013.01); *B60W 30/143* (2013.01);
(Continued)

(58) Field of Classification Search
CPC .. B60W 30/06; B60W 30/143; B60W 40/105; B60W 2420/52; B60W 2420/54;
(Continued)

(56) References Cited

U.S. PATENT DOCUMENTS 6,816,804 B1    11/2004  Lee
7,930,096 B2 *   4/2011  Kubota .................. B60Q 9/008
                                                        340/575
(Continued)

OTHER PUBLICATIONS

International Search Report and Written Opinion for International Patent Application No. PCT/EP2015/052154, dated Jul. 30, 2015, 14 pages.

*Primary Examiner* — Rachid Bendidi
(74) *Attorney, Agent, or Firm* — Marger Johnson

(57) ABSTRACT

Apparatus for determining the ground speed of a vehicle, comprising a plurality of sensing systems each of which is configured to provide a respective data source indicative of the ground speed of the vehicle; a controller configured to receive each of the data sources from the plurality of sensing systems; wherein the controller is configured to arbitrate between the received plurality of data sources from the plurality of sensing systems, determine a ground speed parameter from one of the data sources, and output the ground speed parameter for use within the vehicle. The invention also resides in a method for determining the ground speed of a vehicle and a computer program product that embodies said method.

20 Claims, 3 Drawing Sheets

(51) Int. Cl.
   *G06F 7/00* (2006.01)
   *G06F 17/00* (2006.01)
   *B60W 40/105* (2012.01)
   *B60W 30/14* (2006.01)
   *B60W 30/06* (2006.01)

(52) U.S. Cl.
   CPC ..... *B60W 2420/52* (2013.01); *B60W 2420/60* (2013.01); *B60W 2520/10* (2013.01); *B60W 2720/10* (2013.01)

(58) Field of Classification Search
   CPC ......... B60W 2420/60; B60W 2520/10; B60W 2550/402; B60W 2720/10
   See application file for complete search history.

(56) References Cited

U.S. PATENT DOCUMENTS

| | | | |
|---|---|---|---|
| 2003/0004644 A1* | 1/2003 | Farmer | B60W 30/16 701/301 |
| 2005/0116854 A1* | 6/2005 | Beez | G01S 7/4026 342/70 |
| 2007/0010938 A1 | 1/2007 | Kubota et al. | |
| 2010/0017128 A1 | 1/2010 | Zeng | |
| 2010/0094530 A1* | 4/2010 | Phuyal | G08G 1/091 701/117 |
| 2010/0262325 A1* | 10/2010 | Fernandez | B60L 1/00 701/22 |
| 2011/0190972 A1* | 8/2011 | Timmons | G01C 21/34 701/31.4 |
| 2012/0173068 A1* | 7/2012 | Seiter | B60T 7/22 701/23 |

* cited by examiner

APPARATUS AND METHOD FOR USE IN A VEHICLE

CROSS-REFERENCE TO RELATED APPLICATIONS

This application is a 371 of International Application No. PCT/EP2015/052154, filed 3 Feb. 2015, which claims priority to GB Patent Application 1402395.6, filed 12 Feb. 2014, the contents of which are incorporated by reference herein in their entirety.

TECHNICAL FIELD

The present invention relates to techniques for determining an accurate measure of the true ground speed of a vehicle as an alternative to vehicle speed measurements that are based on the wheel speed of the vehicle. Aspects of the invention relate to an apparatus for determining the ground speed of a vehicle, to a vehicle incorporating the apparatus, to a method for determining the ground speed of a vehicle and also to a computer program product and carrier medium embodying the method.

BACKGROUND

It is a requirement for automobiles to be equipped with a system to provide a measurement of the speed of the vehicle. Early forms of vehicle speed measurement systems or 'speedometers' were largely mechanical and involved the use of a mechanism linking the rotation of an axle or a wheel of the vehicle to angular movement of a needle mounted in a calibrated gauge to provide a readout of vehicle speed. Modern speedometers, however, have moved from mechanical to electronic-based systems and typically involve a rotation sensor, such as an optical, inductive or magnetic sensor, mounted in the transmission or a wheel of the vehicle.

Common to these types of vehicle speed sensing techniques is that they rely on the rotation of the wheels/driveshaft providing an accurate indication of the speed of the vehicle over the ground. However, in some vehicle applications, and under some driving conditions, the wheel speed can be misleading for determining vehicle speed. This is particularly true with off-road vehicles, or road vehicles with off-road capability, since they may operate in conditions where considerable wheel slip occurs.

It has been proposed to use a Doppler velocity technique to provide a ground speed measurement for a vehicle. Such a system is known for tractors used in the agricultural industry, and such a system is also exemplified in EP0534418B1. In such systems a radar transceiver directs a radar beam onto the ground at an oblique angle at a predetermined frequency which is then reflected off the ground back to the transceiver. Due to the fact that the vehicle is moving relative to the ground, a frequency shift occurs between the outbound and inbound radar signals due to the Doppler effect. Since the frequency shift is directly proportional to speed, it can be used to determine accurately the absolute vehicle speed over the ground. However, up to now the practical application of such systems have been limited.

It is against this background that the invention has been devised.

SUMMARY OF THE INVENTION

In a first aspect, the invention provides apparatus for determining the ground speed of a vehicle, comprising a plurality of vehicle-mounted sensing systems each of which is configured to provide a respective data source indicative of the ground speed of the vehicle; and a controller configured to receive each of the data sources from the plurality of sensing systems. The controller is configured to arbitrate between the received plurality of data sources from the plurality of sensing systems, determine a ground speed parameter from one of the data sources, and output the ground speed parameter for use within the vehicle.

The invention therefore provides a means of accessing accurate ground speed data across a wide range of conditions by selecting between multiple sources of ground speed data, which selection process may be dependent on predetermined criteria. So, if one particular data source indicative of ground speed is determined to be unsuitable for the calculation of ground speed parameter for use within the vehicle, the controller may determine that a different data source should be selected for the calculation process In determining if the data sources are suitable for the calculation of the ground speed parameter, the controller may be configured to assess the reliability of one of said data sources received from respective ones of the sensing systems and to perform said arbitration and to determine the ground speed parameter in dependence on the reliability assessment. In one embodiment the assessment of reliability is based on a metric indicative of the confidence level of the data source, which metric may be integrated into the data sources.

As an alternative to the reliability assessment, or in addition to it, the controller may determine the suitability of the data sources for calculating the ground speed parameter by identifying a vehicle operating condition and selecting one of the data sources for determining the ground speed parameter in dependence on the identified vehicle operating condition.

The plurality of sensing systems may include: a GNSS system, that may form part of a satellite navigation system of the vehicle; a radar Doppler system, that may form part of an adaptive cruise control of the vehicle; and an acoustic Doppler system, that may form part of a parking assist system of the vehicle.

In use of the vehicle, the controller may output a ground speed parameter to one or more client systems of the vehicle that may be selecting from one or more of i) a hill descent system, ii) a launch control system, iii) a controlled stop system, iv) a stability control system, v) a torque vectoring system and vi) a terrain response system.

In a further aspect, the invention may reside in a vehicle incorporating the apparatus described above.

In another aspect, the invention resides in a method of determining the ground speed of a vehicle, comprising: receiving a plurality of data sources indicative of vehicle ground speed from a respective plurality of vehicle-mounted sensing systems and arbitrating between the plurality of data sources so as to select one of the plurality of data sources to be used in determining a ground speed parameter of the vehicle.

Preferred and/or optional features of the previously described aspects of the invention may also be combined with this aspect of the invention.

The method of the invention is suitable for being implemented on an appropriate processing module within the vehicle. Thus the method of the invention can also be considered to reside in a computer programme product carriable on a computer readable medium which, when executed on a data processing apparatus is operable to perform the method of the invention, and in a computer readable medium loaded with the aforesaid product.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
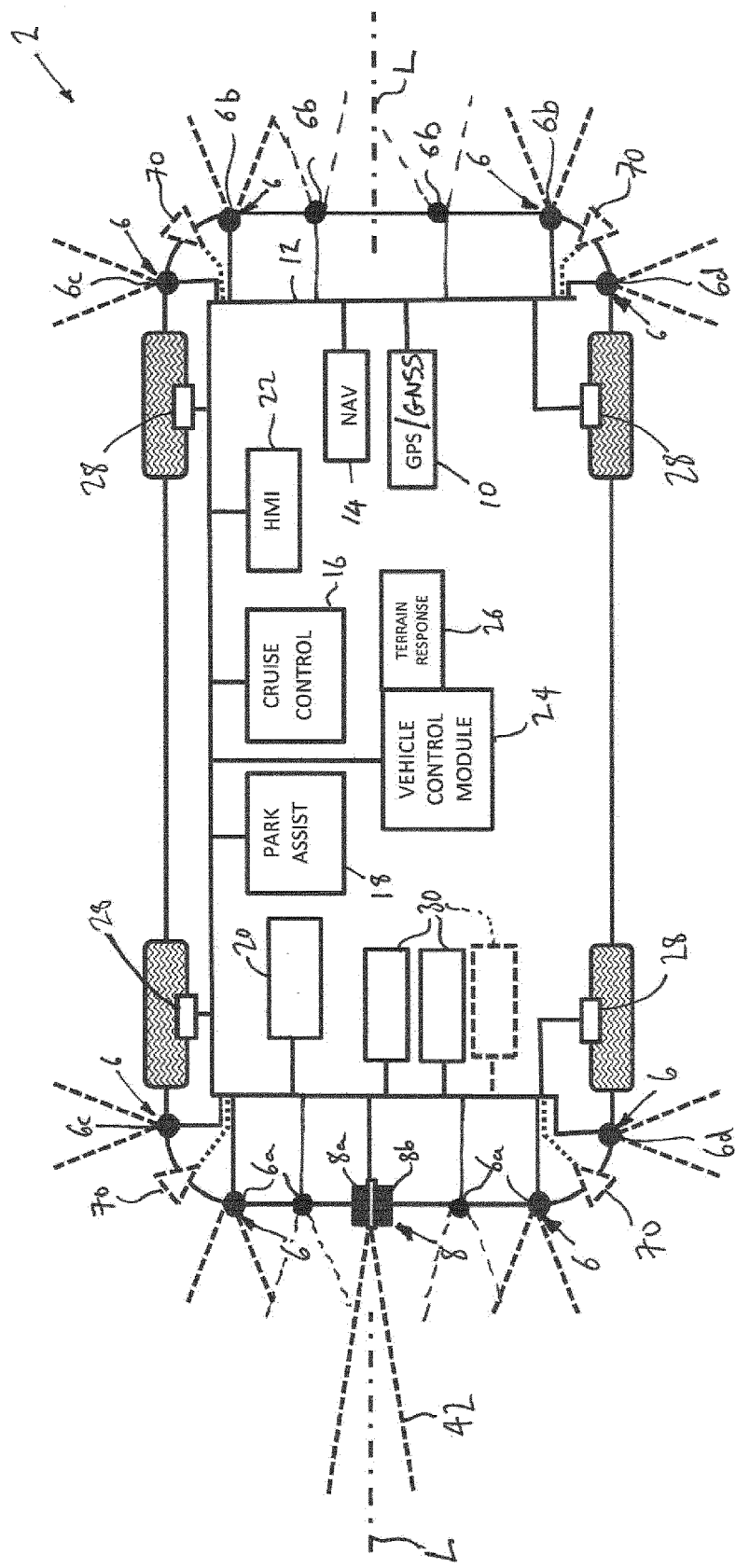
FIG. 1 is a schematic view of a vehicle apparatus.

FIG. 1 shows in schematic form a vehicle 2 having a plurality of vehicle systems. It will be appreciated that FIG. 1 is simplified for the purposes of this description and so is not meant to represent a complete electrical system of a vehicle. However, suitable components and functional modules are shown in order to provide an understanding of the inventive concept.

In the following description it should be noted that where a controller or processor is described as being configured to perform a described function, this should be considered to mean that the processor includes a means for performing that function, for example that the processor may be programmed with a program, or may execute a program stored in an associated memory unit that causes the processor to perform that function.

In overview, the vehicle 2 comprises a plurality of acoustic sensors 6, a forward-looking radar sensor 8, and a GNSS (global navigation satellite system) sensor/receiver 10 that are interfaced with a vehicle local area network (LAN) 12. The system 4 also includes a navigation control module 14, an adaptive cruise control module 16, a park assist module 18, a ground speed determination module 20, a HMI module (human-machine interface) 22 and a vehicle control module 24, all of the aforesaid modules being interfaced to the LAN 12 so as to be able to communicate bi-directionally with various other vehicle sub-systems in accordance with a suitable communications protocol such as the CAN (controller area network) protocol which is well known in the art.

Typically, the HMI module 22 incorporates a display screen and an interface device such as a rotary selection dial, four-way directional selection buttons or a touchscreen interface, although other input means may also be used, for example voice activation. The HMI 22 is used to display alerts to the vehicle user regarding the appropriate vehicle set-up, and in response to which the user can adjust various vehicle settings, as appropriate. For example, the HMI module 22 may be used by the park assist module 18 to display information on the rear-facing view from the vehicle, or the navigation module 14 may display map and route information via the HMI module 22.

By way of further example, a vehicle user may use the HMI module 22 to access in-car entertainment systems or to access functionality provided by the vehicle control module 24. In some vehicles the vehicle control module 24 is configured to allow adjustments to be made to the ride characteristics of the vehicle. For example, in the context of a vehicle terrain response function 26 associated with the vehicle control module 24, data from vehicle-mounted sensors 28 (wheel speed sensors, tyre pressure sensors, brake force sensors, suspension articulation sensors, pitch sensors, yaw sensors and the like) relating to the terrain over which the vehicle is travelling are received by the vehicle control module 24 which is operable to process the data and transmit control commands to one or more further subsystems 30 of the vehicle (such as a suspension system, traction control system, engine torque vectoring system, stability control system or ride height adjustment system) so as to allow adjustment of the vehicle setup accordingly. The vehicle setup may be initiated by the user via the HMI module 22 or it may be controlled automatically by the vehicle control module 24.

Although shown as a single control module for simplicity, it will be appreciated that the functions of the vehicle control module 24 may be performed by a plurality of electronic control units/modules (ECUs) each performing a specific function (e.g. Terrain Response function) and communicating with one another via the CAN protocol.

The above discussion provides a broad overview of the configuration of the electrical systems in the vehicle and, as has been mentioned, the vehicle 2 includes cruise control functionality provided by the adaptive cruise control module 16 and parking assistance functionality provided by the park assist module 18. Details of both of these functions will now be described in more detail.

Adaptive Cruise Control Function

Adaptive cruise control (ACC) functions for vehicles are known, and are operable to adjust the vehicle speed to maintain a safe distance from vehicle in the road ahead. Commonly, radar sensors are used to generate data about the traffic ahead of the vehicle for processing by a suitable processing system, although it should be noted that non-radar based systems are also in use, for example using video camera technology, lasers or acoustic-based sensing systems. Since adaptive cruise control functionality is generally known in the art, only a brief explanation will be described here.

In the vehicle 2 described with reference to FIG. 1, the vehicle-mounted radar sensor 8 associated with the adaptive cruise control (ACC) module 16 is mounted in the centre of the front of the vehicle so that it has an unobstructed view of the road ahead. The radar sensor 8 has a radar transmitter 8a and a radar receiver 8b. Such radar sensors are known in the art, for example as part of the 'ACC Stop & Go' system provided by Bosch, and the multimode electronically scanning radar provided by Delphi Corporation.

The radar sensor 8 may be mounted in any suitable position, such as in the grille of the vehicle or, alternatively, mounted behind or integrated into a suitable trim-piece such as a bumper (fender), or fog lamp unit. Although the radar sensor 8 is described as being centrally mounted it is also acceptable for it to be mounted in an off-centre position.

At this point it should be appreciated that in principle any frequency of radar signal is applicable, although in the automotive industries the use of radar is currently licensed to the spectrum extending between 21.65 to 26.65 GHz and 76 to 81 GHz. A particularly suitable type of radar sensor may be a frequency-modulated continuous-wave (FMCW) radar sensor.

In the embodiment of FIG. 1, the radar transmitter 8a and radar receiver 8b are oriented in alignment with a longitudinal axis L of the vehicle 2 such that a field of view of the radar receiver 8b is substantially symmetrical about the axis L and that the emission beam of the radar transmitter 8a irradiates a region ahead of the vehicle 2 that is also substantially symmetrical about the axis L. The irradiated region and the field of view are both shown here by a substantially conical region identified as reference '42'.

In order to detect vehicles in the road ahead accurately and at suitable distances in excess of 100 meters away it is preferred that the radar sensor has a relatively narrow beamwidth in the region of 10 degrees cone angle, by way of example. One example of a suitable system is the multimode electronically scanning radar as provided by Delphi Corporation which implements a narrow-beam long-range (approx. 174 m) radar coverage in conjunction with a wide-beam mid-range radar coverage.

The ACC module 16 is configured to determine the range of objects (i.e. vehicles) ahead of the vehicle 2 by measuring a frequency difference between the signal transmitted by the radar transmitter 8a and the signal received by the radar receiver 8b. It is to be noted that alternative embodiments may be based on a time-of-flight analysis of the reflected radar signal to determine the range of objects.

The ACC module 16 is further configured to determine the velocity of the objects in the road ahead relative to the velocity of the vehicle 2 based on the difference between the frequency of the radar return signal and the frequency of the transmitted radar signal. Due to the Doppler effect, the frequency of the radar signal return will be different to the emitted signal and so the ACC module 16 is able to calculate the speed of the object ahead relative to the speed of the vehicle in dependence on the frequency shift between the emitted and returned signals.

When the ACC module 16 is activated, which is usually on the demand of the user, it is operable to maintain the speed of the vehicle 2 whilst also maintaining a desired distance from another vehicle in the road ahead. The 'desired distance' is that distance that is considered to be a safe following distance between vehicles and may be a pre-programmed parameter within a suitable memory unit of the ACC module 16. The desired distance parameter may be adjustable by the user of the vehicle or, alternatively, manual adjustment may be limited (e.g. by a minimum separation distance) or prohibited in order to prevent possible abuse of the system.

In order to maintain the desired distance from the vehicle in front, the ACC module 16 communicates with other systems of the vehicle (throttle control, brake control etc via the vehicle control module 24) and the necessary action is taken by those systems to maintain a constant distance to the vehicle in front.

Radar sensors may be positioned at other locations on the vehicle to collect data to be input to other systems, for example blind spot detection (BSD) systems, lane departure warning systems, or detection systems for detecting external static or portable speed measurement systems, such as those used for detecting vehicles exceeding speed limits.

In the embodiment in FIG. 1 a single radar sensor is provided, although it should be noted that more than one radar sensor is possible. For example, a combination of long range radar sensors and short range radar sensors could be employed, the short range radar sensors being particularly adept at providing information in the flank regions of the vehicle, for use in blind spot protection systems, lane change warning systems and the like.

Park Assist Function

It is known to provide vehicles with systems that aid the driver of the vehicle to park in tight spaces, particularly during parallel parking manoeuvres. Relatively simple systems are based around providing an array of parking distance control (PDC) sensors on the rear edge of a vehicle, typically integrated within the bumper/fender. More recently, however, more sophisticated systems have been developed which provide the vehicle with an all-round sensing capability and which are operable to identify a suitable space in which a vehicle should be able to park and to control the vehicle automatically to park within the identified space. In the art, such systems may be referred to by a variety of terms such as 'parking assist systems', 'intelligent parking systems', and 'smart parking systems'.

With reference to FIG. 1, the vehicle is provided with a parking assist function by the park assist module 18 that is provided with data regarding the vicinity of the vehicle by the acoustic sensors 6.

The acoustic sensors 6 are ultrasonic transceivers that are positioned at respective locations around the periphery of the vehicle 2. In the embodiment shown, four ultrasonic sensors 6a are installed in the front edge of the vehicle (for example integrated in the bumper), one either side of the radar sensor 8. Four ultrasonic sensors 6b are positioned on the rear edge of the vehicle 2 (e.g. integrated into the rear bumper), two ultrasonic sensors 6c are mounted at spaced apart locations on the right hand side of the vehicle and two ultrasonic sensors 6d are mounted at spaced apart locations on the left hand side of the vehicle. All of the ultrasonic sensors 6 are linked to the LAN 12 and so are able to communicate with the park assist module 18.

The ultrasonic sensors 6a installed at the front of the vehicle 2 are oriented to direct an ultrasonic signal in a forwards direction. Likewise, the ultrasonic sensors 6a are arranged to direct respective signals rearwards of the vehicle and the ultrasonic sensors installed 6c,6d in the sides of the vehicle are arranged to emit respective signals perpendicularly away from the longitudinal axis L of the vehicle 2. Also, it should be noted that the ultrasonic sensors 6c,6d are inclined towards the road surface so as to be able to pick up low-lying obstacles in the road such as kerbs. The sensors 6c,6d may be inclined at a range of angles, but it is currently envisaged that the sensors are angled 45 degrees to the horizontal.

The ultrasonic transceivers 6 preferably operate at a frequency between 40 and 55 kHz, more specifically about 51 KHz. One such sensor that may be used in such a system is available from Knowles Acoustics Ltd, model number SPM0204UD5.

The park assist module 18 is operable to receive data from all of the ultrasonic sensors 6 over the LAN 12 and process the received data to build up an image of the obstacles surrounding the vehicle. In particular the side-mounted sensors 6c,6d are operable to determine the location of gaps in rows of parked cars, but also to determine the location of other obstructions such as kerbs which the park assist module 18 can use in order to position the vehicle correctly in a parking space. The parking assist module 18 is operable to warn a vehicle user, either by visual or audible means, of the vehicle's proximity to an obstacle. In the case of an audible warning, a warning tone may sound at an increasing rate or volume as an obstacle becomes closer to the vehicle. The acoustic sensors used for parking assistance systems are typically able to detect obstacles at short-range (0.25-2.5 meters) but at a wide angle from the direction in which the sensor is pointed.

It is to be noted that in general parking assist system are known in the art so a detailed explanation of such a system will not be provided here.

The data generated by the ultrasonic sensors 6a-d may also be used to provide information relating to the ground speed of the vehicle since, due to the Doppler effect, the signal return to the sensors will have a frequency shift compared to the signal emitted by the sensors 6a-d. This data may therefore be used by the ground speed determination module to calculate the ground speed of the vehicle in a manner that will now be described.

Determination of Vehicle Ground Speed

The above described systems are regularly included in vehicles as standard options. Each system is generally only used for short periods during driving, for example during a parking manoeuvre. Therefore, the sensors and processors associated with each system are idle for long periods. Accordingly, there is an opportunity to use these sensors for other purposes during these periods. One such use will now be described.

Indicated vehicle speed is usually presented to the vehicle user by a speedometer which is often mounted in an instrument cluster located in front of the driver and behind the steering wheel in a visible position. Typically the speedometer will base the presented vehicle speed on data that is gathered from rotation sensors integrated into the wheels of the vehicle or, alternatively, on the vehicle drive shaft downstream of the gearbox. However, this vehicle speed data may not be a reliable indication of the true ground speed of the vehicle in all circumstances because it is based in the assumption that wheel rotation will always be translated directly into vehicle movement. In many circumstances, particularly during slippery conditions or during off-road driving, this is not the case and reliance on the speed of rotation of the wheels to provide true ground speed data provides a misleading indication of vehicle speed. Furthermore, speed sensing systems that are based on wheel speed rotation generally are not able to detect speeds lower than about 3 kph, which limits how that data can be used by other systems of the vehicle.

Accurate knowledge of the ground speed of the vehicle is desirable to enhance the controllability of the vehicle during low traction conditions, for example when the vehicle is travelling on icy or wet/muddy ground, and/or when the vehicle is in a skid situation. To this end, the ground speed determination module 20 is operable to receive data from a plurality of sensing systems of the vehicle and provide as an output a value of vehicle ground speed to a plurality of client systems of the vehicle.

Figure 2:
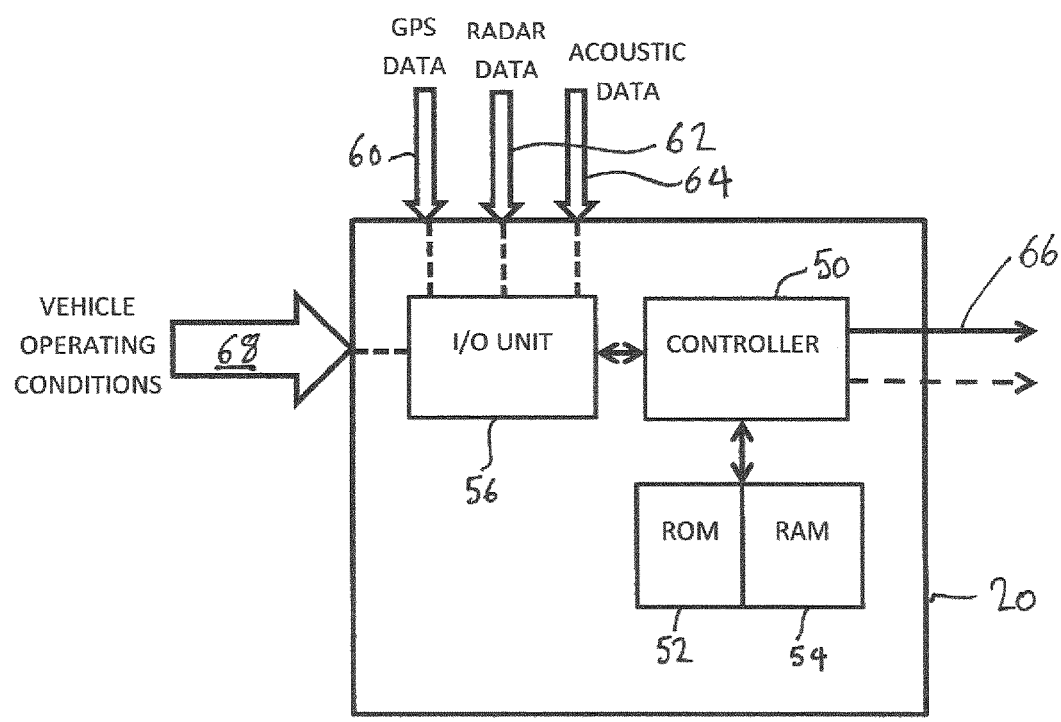
FIG. 2 is a schematic block diagram of a processing module of the vehicle apparatus.

The ground speed determination module 20 (hereinafter 'GSD module') is shown in FIG. 1 in the context of the vehicle, and is illustrated schematically in more detail in FIG. 2 as incorporating a hardware configuration including at least a processing means or 'controller' 50 that is operable to perform control processing, a ROM (read only memory) 52 in which control programs for implementation by the controller 50 are stored, and a RAM (random access memory) 54 for the purposes of the temporary storage of data during the operation of the GSD module 20. The GSD module 20 also includes an I/O unit (input/output) 56 which acts as an interface between the LAN 12 and the controller. The ROM 52, RAM 54, controller 50 and I/O unit 56 are linked by suitable data buses 58 or, alternatively, they may be incorporated into a single solid-state device.

The GSD module 20 is operable to calculate the absolute ground speed of the vehicle independent of the rotational speed of the wheels and, to this end, the GSD module 20 receives data from a plurality of vehicle sensor systems into the I/O unit 56. As illustrated, the GSD module 20 receives a first data input 60 from the GNSS receiver 10 (GNSS data input), a second data input 62 from the radar sensor 8 (radar data input) and a third data input 64 from one or more ultrasonic sensors 6 (ultrasonic data input).

Although the GSD module 20 is shown here as accepting three data inputs, it should be appreciated that the GSD module 20 may be configured to receive further input data from systems that are capable of providing measurements of the ground speed of the vehicle. For example, the vehicle may incorporate an inertial measurement unit (IMU) that uses accelerometers and gyroscopes to calculate by way of dead reckoning the position, orientation and velocity of the vehicle, or may use optical tracking methods, for example using data streams from pre-existing cameras already placed on the vehicle.

It should be noted that none of the vehicle sensor systems that provide data to the GSD module 20 are intended primarily for that purpose. For example, the radar sensor 8 forms part of the adaptive cruise control function and the ultrasonic sensors 6 form part of the park assist function. The functionality of the GSD module 20 in this embodiment is therefore provided for the vehicle with minimal further hardware costs since dedicated sensor suites are not required.

In overview, the GSD module 20 receivers several sources of ground speed data through the plurality of data inputs 60,62,64 and arbitrates between the different data inputs to provide a ground speed data output 66 to various client systems of the vehicles. In this embodiment the process of arbitrating between the data inputs 60-64 is based partly upon the suitability of the prevailing vehicle operating condition and partly on the determined reliability of the data inputs. Note that the prevailing vehicle operating condition is determined from a plurality of vehicle operating parameters, identified here by the general reference 68.

The client systems may be any vehicle system that is able to make use of an accurate and precise measurement of the absolute ground speed of the vehicle. Although not described specifically here, examples of such client systems may be: a hill descent system in which the vehicle is controlled to descend a hill at a predetermined speed, a controlled stop system in which the vehicle is controlled to come to a halt at a predetermined low rate of deceleration, a launch control system in which the vehicle traction system is controlled to accelerate the vehicle at an optimal rate according to the surface conditions, a stability control system, a torque vectoring system, and a terrain response system.

Figure 3:
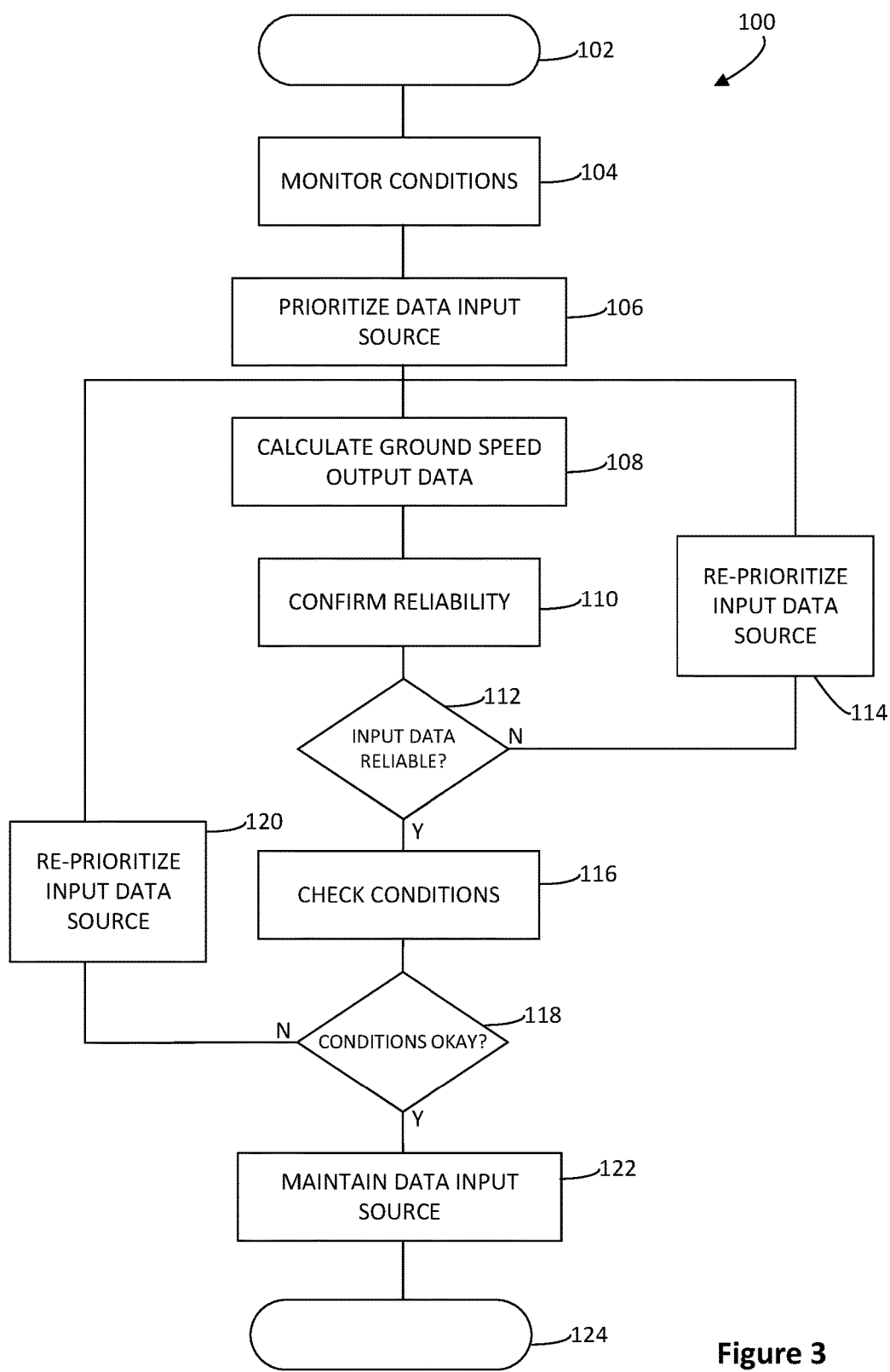
FIG. 3 is a flow chart of a method that may be implemented by the processing module of FIG. 2.

In one embodiment, the controller 50 is operable to implement a method by which it arbitrates between the multiple data inputs 60-64 in dependence on one or more of i) the reliability of the data inputs and ii) a vehicle operating condition, and then provides priority to one of the data inputs in order to calculate the ground speed of the vehicle. This embodiment will now be described with reference to FIG. 3.

The process 100 begins at step 102 upon activation of the vehicle ignition. At step 104 the controller 50 begins the process of monitoring the ground speed data inputs 60-64 to identify which data inputs are available to it over the LAN 12. The controller 50 also monitors the vehicle operating condition by analysing the plurality of vehicle operating parameters 68. One such vehicle operating parameter may be vehicle speed as indicated by the wheel speed sensors 28.

At step 106 the controller 50 selects one of the data inputs 60-64 and allocates this data input priority for use in downstream calculations. Then, at step 108, the prioritised data input is used to calculate a ground speed parameter which is therefore provided to one or more client systems via a data output 66. By way of example, if the controller 50 determines that the indicated speed of the vehicle 2 is over a first predetermined threshold, for example 5 mph, the controller 50 may be configured to prioritise the GNSS data input 60, calculate a ground speed parameter from the GNSS data input 60 and output the ground speed parameter to the client systems via data output 66. It should be appreciated that at vehicle speeds over 5 mph, the ground speed data provided by the GNSS receiver 10 is considered to be accurate to within 5% which is an acceptable precision to the client systems.

Following the determination of which data input 60-64 should be prioritised for use in the calculation of the ground speed data output 66, the controller 50 then checks, at step 110, the reliability of the prioritised data input source 60-64, which in this example is GNSS data 60.

In order to provide a metric of the reliability of data, most input data sources are provided with a confidence level indication. For example, in a GPS system (a type of GNSS), a 'dilution of precision' or DOP is provided. Such a metric indicating the confidence in the data source may be used to rank data sources in terms of their reliability.

The process 100 then enters a decision step 112 the output of which depends on the reliability of the prioritised data input 60. If the data input 60 is determined not to be reliable, the process returns to step 108 through step 114. At step 112 a different data input source 60-64 is prioritised for the purposes of calculating the ground speed data output 66 at step 108. By way of example, the radar data input 62 may be identified as the next data input to be prioritised in preference to the GNSS data input 60 if said GNSS data is determined to be unreliable, for example, if the vehicle has limited satellite coverage as would be the case if the vehicle enters a tunnel or travels under a thick tree canopy. One option is for the multiple data inputs to have a dynamic 'order of preference' that depends on the reliability of the data inputs. So, more reliable data inputs will have a higher rank in the order of preference than less reliable data inputs.

If, however, the reliability of the selected data input 60 is determined to be acceptable at step 112, then the process continues to step 116 at which step the operating condition of the vehicle is checked to confirm that the prioritised data input 60 is suitable for use in calculating the ground speed data output 66. It should be noted that in order to determine the vehicle operating condition, the controller 50 may be provided with a suitable database in ROM 52 that cross-references a plurality of predefined vehicle operating conditions to one or more of the associated vehicle operating parameters 68. For example, a vehicle operating condition 'high speed travel' may be associated with an indicated vehicle speed of greater than 5 mph. Some examples of other vehicle operating conditions that may be useful for determining whether the prioritised data input is suitable are high/low range gearing; ambient temperature thresholds; suspension ride height, GPS position and water wading.

The process then enters decision step 118 the output of which depends on the suitability of the prioritised data input 60 for the current vehicle operating condition. If the prioritised data input is determined not to be suitable for the current vehicle operating condition, the process moves to step 120 where the controller re-prioritises the data input 60-64 that is used to calculate the ground speed data output 66 subsequently at step 108. As an example of this, consider the case where the currently prioritised data input source is GNSS data 60. If the vehicle is travelling at greater than 5 mph, the controller 50 may determine that GNSS data input source 60 is suitable for calculating the ground speed data output 66. However, if the vehicle speed falls below 5 mph, the controller 50 may determine that GNSS data is not sufficiently accurate to be suitable for the current vehicle operating condition and may therefore re-prioritise the radar data input source 62 for calculation of the ground speed data output 66.

Returning to the decision step 118, if it is determined that the currently prioritised data input 60 is suitable for the current vehicle operating condition, the process moves to step 122 at which the controller 50 maintains the selection of the currently prioritised data input 60. The process then terminates at step 124.

The above embodiment describes the process 100 as it operates once from start to finish and it should be noted that the process may be configured to be run repeatedly at a suitable frequency in order to ensure that the appropriate data source is prioritised for calculation of accurate ground speed data. It is currently envisaged that a repeat frequency of 1 Hz would be acceptable, although a faster or slower rate would also be acceptable. However, the calculation of the ground speed data output 66 at 108 may run as a background task at a higher rate and it is currently envisaged that the controller 50 will output the ground speed data output 66 at a frequency of between 5 and 10 Hz.

It will be appreciated that variations to the above embodiments may be made without departing from the scope of invention as defined by the claims.

For example, in the above process 100 the selection that is made between ground speed data input sources is dependent on both of i) the prevailing vehicle operating condition and ii) the reliability of the data input source. However, it should be appreciated that the process may also be implemented so that the selection that is made between ground speed data input sources is dependent on only one of i) the prevailing vehicle operating condition, or ii) the reliability of the data input source.

The embodiment described above discusses radar and acoustic sensors that are used for other purposes on the vehicle which minimises the manufacturing cost of adding the ground speed calculating function to the vehicle. However, it should be appreciated that dedicated sensing hardware may also be added to the vehicle. Alternatively, existing sensing hardware may be modified to optimise it for dual-use in multiple systems. In one embodiment, for example, a sensor data package combining radar and ultrasonic sensors may be arranged on each of the four corners of the vehicle. This is illustrated in schematic form in FIG. 1 by the ghosted components referenced as 70. To optimise the sensor packages 70 for reception of Doppler data, the sensor packages may be angled so that they point towards the ground.

In the description above, the ground speed determination module 20, the park assist module 18, the adaptive cruise control module 16 and the navigation module 14 have been described as distinct functional modules. As such, they should be considered to represent separate processing functions provided by suitable electronic equipment in the vehicle. However, it will be appreciated that the functions may not be provided by physically separate processing entities and may instead be provided by an integrated processing entity such as a vehicle control module as is generally known in the art.

The invention will now be expressed in the following numbered clauses:

1. Apparatus for determining the ground speed of a vehicle, comprising:
   a plurality of vehicle-mounted sensing systems each of which is configured to provide a respective data source indicative of the ground speed of the vehicle;
   a controller configured to receive each of the data sources from the plurality of sensing systems;
   wherein the controller is configured to arbitrate between the received plurality of data sources from the plurality of sensing systems, determine a ground speed parameter from one of the data sources, and output the ground speed parameter for use within the vehicle.
2. The apparatus of clause 1, wherein the controller is configured to assess the reliability of one of said data sources received from respective ones of the sensing systems and to perform said arbitration and to determine the ground speed parameter in dependence on the reliability assessment.
3. The apparatus of clause 2, wherein the assessment of reliability is based on a metric indicative of the confidence level of the data sources
4. The apparatus of clause 1, wherein the controller is configured to determine a vehicle operating condition and to select one of the data sources for determining the ground speed parameter based on the vehicle operating condition.
5. The apparatus of clause 1, wherein the plurality of sensing systems for providing a data source indicative of the vehicle ground speed of the vehicle include a GNSS system; a radar Doppler system; and an acoustic Doppler system.
6. The apparatus of clause 5, wherein the GNSS system forms part of a satellite navigation system of the vehicle.
7. The apparatus of clause 5, wherein the radar Doppler system forms part of an adaptive cruise control system of the vehicle.
8. The apparatus of clause 5, wherein the acoustic Doppler system forms part of a parking assist system of the vehicle.
9. The apparatus of clause 1, wherein the controller outputs a ground speed parameter to one or more client systems of the vehicle.
10. The apparatus of clause 9, wherein the client systems are selected from one or more of i) a hill descent system, ii) a launch control system, iii) a controlled stop system, iv) a stability control system, v) a torque vectoring system and vi) a terrain response system.
11. A vehicle including the apparatus of clause 1.
12. A method of determining the ground speed of a vehicle comprising:
   receiving a plurality of data sources indicative of vehicle ground speed from a respective plurality of vehicle-mounted sensing systems;
   arbitrating between the plurality of data sources so as to select one of the plurality of data sources to be used in determining a ground speed parameter of the vehicle.
13. The method of clause 12, including arbitrating between the plurality of data sources includes assessing the reliability of said data sources.
14. The method of clause 13, wherein the assessment of reliability is based on a metric indicative of the confidence level of the data sources
15. The method of clause 12, including determining a vehicle operating condition and selecting one of the data sources to be used in determining the ground speed parameter in dependence on the vehicle operating condition.
16. The method of clause 12, wherein the plurality of data sources are received from sensing systems including a GNSS system; a radar Doppler system; and an acoustic Doppler system.
17. The method of clause 12 including outputting the ground speed parameter to one or more client system of the vehicle.
18. The method of clause 17, wherein the client systems are selected from one or more of i) a hill descent system, ii) a launch control system, iii) a controlled stop system, iv) a stability control system, v) a torque vectoring system and vi) a terrain response system.
19. A computer program product carriable on a computer readable medium which, when executed on a data processing apparatus is operable to perform the method of clause 12.
20. A computer readable medium loaded with the computer program product of clause 19.

The invention claimed is:

1. An apparatus for determining a ground speed of a vehicle, comprising:
   a plurality of vehicle-mounted sensing systems each of which is configured to provide a respective data source indicative of the ground speed of the vehicle; and
   a controller configured to receive each of the data sources from the plurality of vehicle-mounted sensing systems, wherein the controller is configured to arbitrate between the received plurality of data sources from the plurality of vehicle-mounted sensing systems, determine a ground speed parameter from one of the data sources, and output the ground speed parameter for use within the vehicle, wherein arbitrating between the received plurality of data sources comprises: prioritizing the data sources, assessing the reliability of the highest priority data source and, in the event that the data source is determined not to be reliable, reprioritizing the data sources, and further wherein the plurality of vehicle-mounted sensing systems for providing a data source indicative of the vehicle ground speed of the vehicle include a GNSS system; a radar Doppler system; and an acoustic Doppler system.
2. The apparatus of claim 1, wherein the GNSS system forms part of a satellite navigation system of the vehicle.
3. The apparatus of claim 1, wherein the radar Doppler system forms part of an adaptive cruise control system of the vehicle.
4. The apparatus of claim 1, wherein the acoustic Doppler system forms part of a parking assist system of the vehicle.
5. The apparatus of claim 1, wherein the controller outputs a ground speed parameter to one or more client systems of the vehicle.
6. The apparatus of claim 5, wherein the client systems are selected from one or more of i) a hill descent system, ii) a launch control system, iii) a controlled stop system, iv) a stability control system, v) a torque vectoring system and vi) a terrain response system.
7. The apparatus of claim 1, wherein the assessment of reliability is based on a metric indicative of the confidence level of the data sources.
8. The apparatus of claim 1, wherein the controller is configured to determine a vehicle operating condition and to select one of the data sources for determining the ground speed parameter based on the vehicle operating condition.
9. The A method of determining a ground speed of a vehicle, comprising:

a controller receiving a plurality of data sources indicative of vehicle ground speed from a respective plurality of vehicle-mounted sensing systems; and the controller arbitrating between the plurality of data sources so as to select one of the plurality of data sources to be used in determining a ground speed parameter of the vehicle by prioritizing the data sources, assessing a reliability of a highest priority data source and, in the event that the data source is determined not to be reliable, reprioritizing the data sources, wherein the plurality of data sources are received from sensing systems including a GNSS system, a radar Doppler system, and an acoustic Doppler system.

10. The method of claim 9, wherein the assessment of reliability is based on a metric indicative of the confidence level of the data sources.

11. The method of claim 9, including determining a vehicle operating condition and selecting one of the data sources to be used in determining the ground speed parameter in dependence on the vehicle operating condition.

12. The method of claim 9, including outputting the ground speed parameter to one or more client system of the vehicle.

13. The method of claim 12, wherein the client systems are selected from one or more of i) a hill descent system, ii) a launch control system, iii) a controlled stop system, iv) a stability control system, v) a torque vectoring system and vi) a terrain response system.

14. The method of claim 9, wherein the GNSS system forms part of a satellite navigation system of the vehicle.

15. The method of claim 9, wherein the acoustic Doppler system forms part of a parking assist system of the vehicle.

16. The method of claim 9, further comprising outputting a ground speed parameter to one or more client systems of the vehicle.

17. A vehicle including an apparatus for determining a ground speed of the vehicle, the apparatus comprising:

a plurality of vehicle-mounted sensing systems each of which is configured to provide a respective data source indicative of the ground speed of the vehicle; and a controller configured to receive each of the data sources from the plurality of vehicle-mounted sensing systems, wherein the controller is configured to arbitrate between the received plurality of data sources from the plurality of vehicle-mounted sensing systems, determine a ground speed parameter from one of the data sources, and output the ground speed parameter for use within the vehicle, wherein arbitrating between the received plurality of data sources comprises: prioritizing the data sources, assessing the reliability of the highest priority data source and, in the event that the data source is determined not to be reliable, reprioritizing the data sources, and further wherein the plurality of vehicle-mounted sensing systems for providing a data source indicative of the vehicle ground speed of the vehicle include a GNSS system; a radar Doppler system; and an acoustic Doppler system.

18. The vehicle of claim 17, wherein the GNSS system forms part of a satellite navigation system of the vehicle.

19. The vehicle of claim 17, wherein the radar Doppler system forms part of an adaptive cruise control system of the vehicle.

20. The vehicle of claim 17, wherein the acoustic Doppler system forms part of a parking assist system of the vehicle.

\* \* \* \* \*